(Model.)

F. B. HUNT.
SULKY PLOW.

No. 254,481. Patented Mar. 7, 1882.

WITNESSES
Fred. G. Dieterich
P. C. Dieterich

INVENTOR
Franklin B. Hunt (Model.)
F. B. HUNT.
SULKY PLOW.
No. 254,481. Patented Mar. 7, 1882.
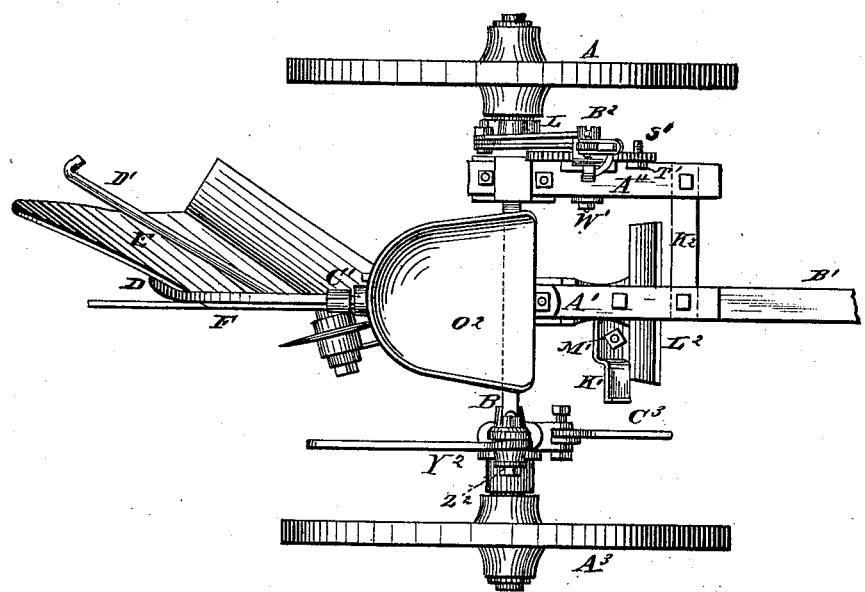
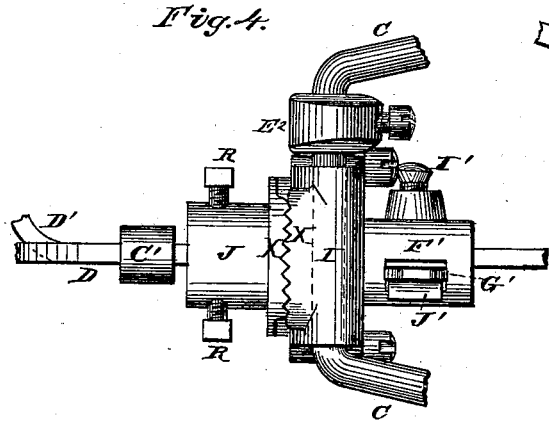
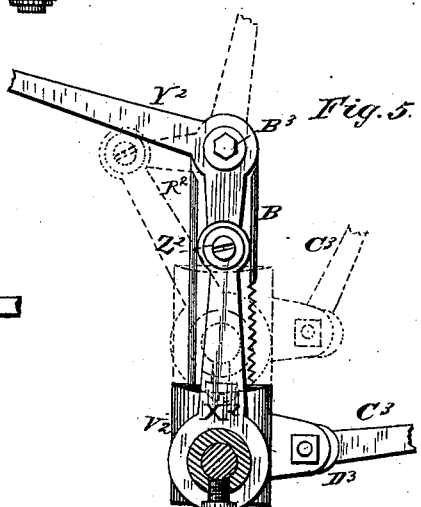
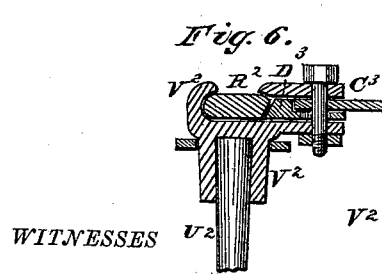
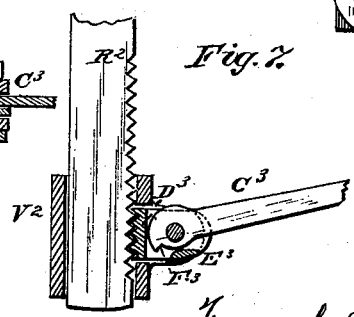
WITNESSES
Fred. G. Dieterich
P. G. Dieterich
INVENTOR
Franklin B. Hunt (Model.)

4 Sheets—Sheet 3.

F. B. HUNT.
SULKY PLOW.

No. 254,481. Patented Mar. 7, 1882.

WITNESSES
Fred. G. Dieterich.
P. C. Dieterich.

INVENTOR
Franklin B. Hunt

N. PETERS, Photo-Lithographer, Washington, D. C.

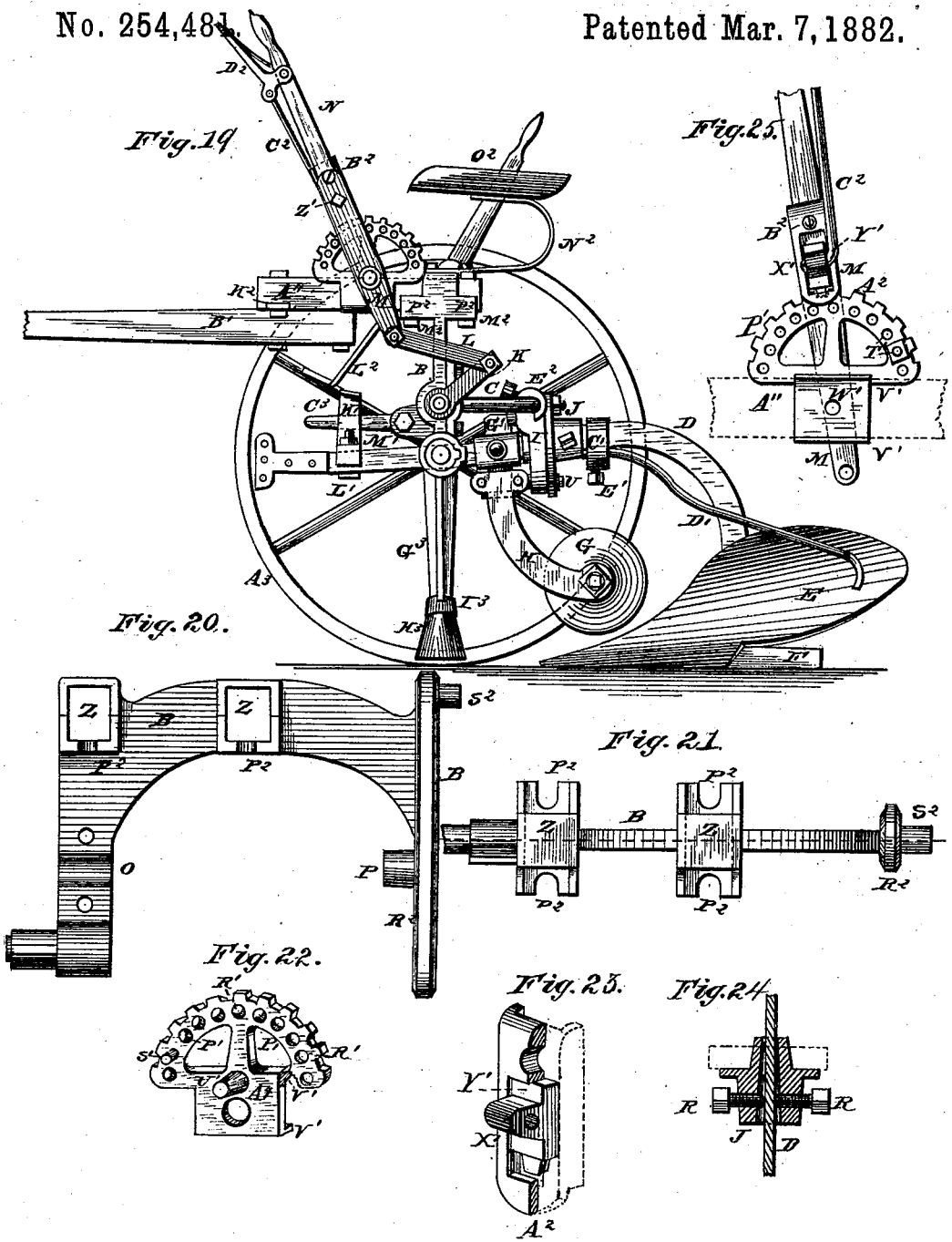

UNITED STATES PATENT OFFICE.

FRANKLIN B. HUNT, OF RICHMOND, INDIANA, ASSIGNOR OF ONE-HALF TO D. B. ROBBINS.

SULKY-PLOW.

SPECIFICATION forming part of Letters Patent No. 254,481, dated March 7, 1882.

Application filed July 8, 1881. (Model.)

*To all whom it may concern:*

Be it known that I, FRANKLIN B. HUNT, of Richmond, in the county of Wayne and State of Indiana, have invented certain Improvements in Sulky-Plows, of which the following is a specification.

My invention relates to a series of improved devices in a sulky-plow, which will be hereinafter fully described and set forth in the specification and claims.

Figure 1:
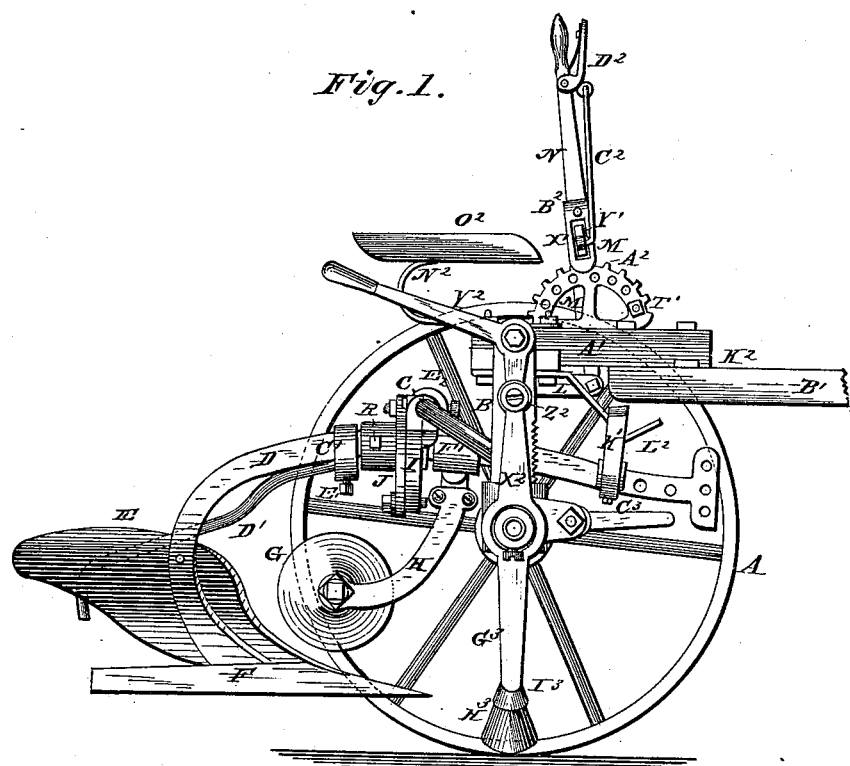
Figure 2:
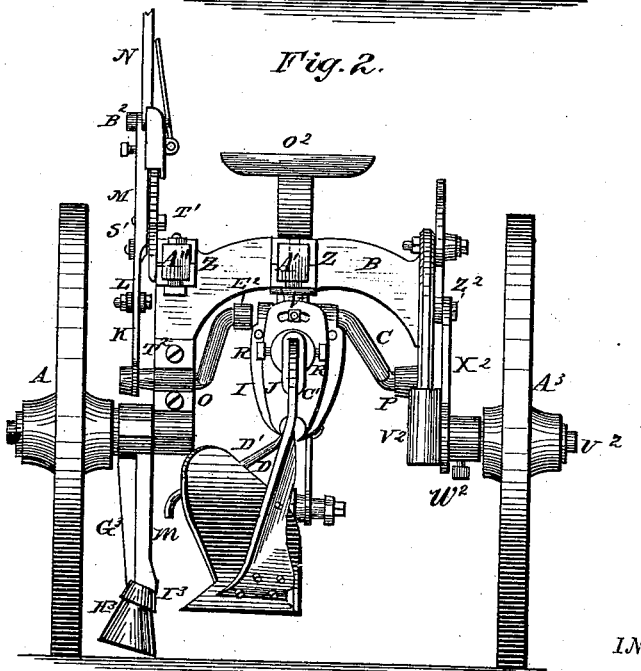
Figure 8:
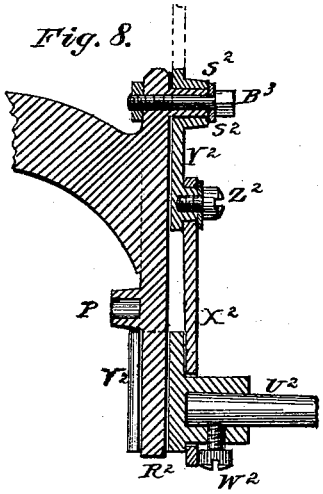
Figure 9:
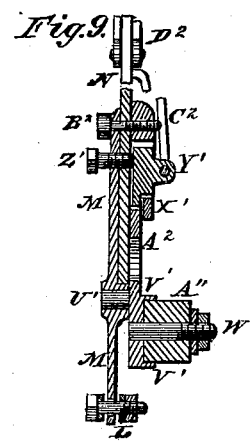
Figure 10:
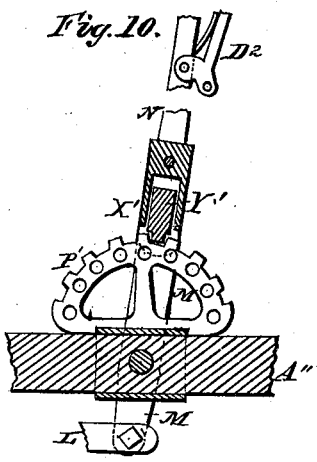
Figure 11:
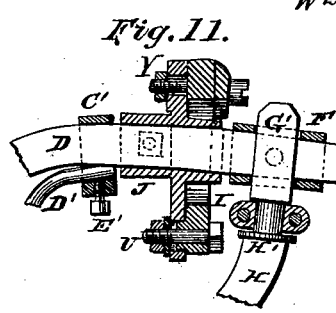
Figures 12, 13:
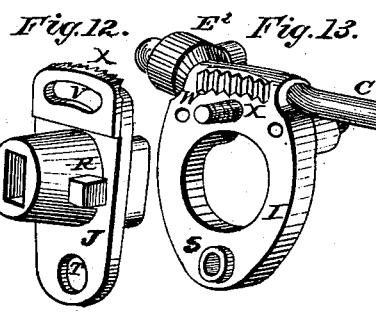
Figure 14:
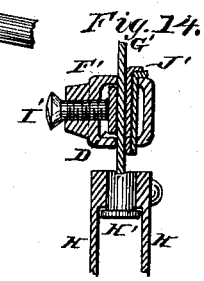
Figure 15:
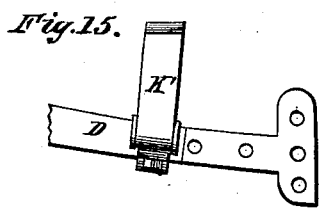
Figure 17:
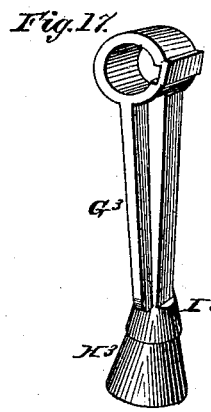
Figure 18:
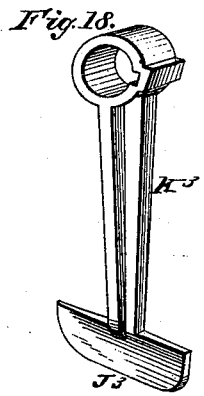
Figure 16:
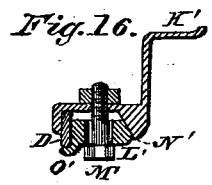

Figure 1 is a side elevation, the right wheel being removed. Fig. 2 is a rear elevation. Fig. 3 is a top plan. Fig. 4 is a top plan, showing the oscillating device through which the plow-beam passes and also receives oblique adjustment. This figure also shows the adjustable cutter-holder attached to the beam. Fig. 5 is a view, partly in section, of the apparatus for raising and lowering the land-wheel. Figs. 6 and 7 are sections of the same. Fig. 8 is a vertical section of the adjusting device for the land-wheel. Fig. 9 is a vertical longitudinal section of the apparatus for raising and lowering the plow. Fig. 10 is a view of the same apparatus as Fig. 9, but partly in section, and showing the attachment of the quadrant to its support. Fig. 11 is a longitudinal vertical section through the oblique adjusting apparatus for the plow-beam, and showing also the cutter-holder attached to the beam. Fig. 12 is a perspective of the oscillator through which the plow-beam passes and receives oblique adjustment. Fig. 13 is a perspective of the hanger attached to the crank or bail and supporting the oscillator. Fig. 14 is a vertical section through the cutter-holder. Fig. 15 is an elevation of a step attached to the plow-beam, and Fig. 16 is a vertical longitudinal section, showing the manner of attaching the step to the plow-beam. Fig. 17 is a plan of a furrow-gage by means of a roller attached to its lower end, and Fig. 18 shows a plan of a furrow-gage by means of a runner in conjunction with the plow. Fig. 19 is a side elevation of the left side of the sulky with the left wheel removed. Fig. 20 is a rear elevation of the seat-arch. Fig. 21 is a top view of the seat-arch. Fig. 22 is a perspective of the quadrant cast in a single piece with the pivot for the lifting-lever attached. Fig. 23 is a perspective of the catch which catches in the teeth or recesses of the quadrant, with its support partly in section. Fig. 24 is a longitudinal horizontal section of a portion of the plow-beam, and a horizontal section through the oscillator, showing the manner of oblique adjustment. Fig. 25 is an inside view of the quadrant attached to its support and with the lifting-lever attached.

This invention consists largely in improvements on my former Patents No. 211,662, of January 28, 1879, and No. 232,505, of September 21, 1880.

A A$^3$ are the wheels; B, the seat-arch, and C the crank or bail to which the plow-beam is pivoted; D, the plow-beam; E, the mold-board, and F the landside of the plow.

G is the rolling cutter suspended from the standards H, and I is a hanger pivoted to the bail C, and having the oscillator J, through which the plow-beam passes, pivoted to it, as seen in Figs. 1, 2, and 11. The crank or bail C is disconnected from the axles, and has its bearings in the seat-arch at O P, Figs. 2 and 20, and is connected to the hand-lever N by means of the lifting-lever K, straps L, and bar M. When the plow is down to its work the bail lies in a horizontal position, as seen in Fig. 19, in consequence of being pivoted above the plow-beam instead of below; so it will be readily seen that when the bail is raised but slightly above the horizontal by means of the hand-lever N and its connecting mechanism the draft at the end of the beam assists to raise the plow when required.

The plow-beam D passes through a wedge-shaped hole in the oscillator J, as seen in Fig. 24, the front portion of the oscillator fitting the beam closely and flaring rearward, where it is provided with the set screws R R for oblique adjustment. The lower end of the hanger I has a pivotal socket, S, upon which the hole T in the oscillator J rests, and is held in place by means of a bolt, U, Figs. 11 and 19.

The upper end of the oscillator has the curved slot V, Fig. 12, which passes over the screw-bolt W, Fig. 13, and is held in place by nut Y, as seen in Fig. 11. The corrugations X X (seen in Figs. 4, 12, and 13) hold the oscillator firmly in place when adjusted. Thus it will be seen that the oscillator, Fig. 12, serves the double purpose of adjusting the plow both obliquely and laterally, the oblique adjustment of the plow being effected by means of the set-screws R R at the rear side of the oscillator, and the lateral adjustment effected through the means of the slot V and the pivot S on the lower end of the hanger I, the corrugations X X on the oscillator and hanger holding all firmly when adjusted. In my construction there is no lateral adjustment at the clevis required, the whole being accomplished at the bail through the means of the wedge-shaped hole in the oscillator and the set-screws R R, as seen in Fig. 24. Neither do I require a jointed tongue to govern the "land" of the plow. The draft being in a straight line, the wheels do not incline to drag sidewise, as when the adjustment is made with the tongue.

The seat-arch B is provided with two socketed bearings, Z Z, for the tongue-timbers A' A''. When the sulky is to be used with two draft-animals the tongue is bolted beneath the middle timber, A', and when three animals are to be used the tongue is bolted beneath the outer timber, A''. The clip C' is attached to the plow-beam in rear of the oscillator for the purpose of attaching to the beam the weed-hook D' by means of the single set-screw E'. The cutter-holder F' is attached to the beam, as shown in Figs. 1, 4, 11, 14, and 19. The single set-screw I' holds all in place when adjusted. The clamp or holder F' can be adjusted forward or backward on the plow-beam, and the cutter-shank G' may be raised or lowered, and the slips J' are placed on either side of the cutter-shank, as required, for lateral adjustment of the cutter. Thus it will be seen that by means of a single set-screw vertical, lateral, and longitudinal adjustments are attained.

By means of the step K', a section of which is shown at Fig. 16, the front end of the plow-beam is thrust down when required, as in starting or after passing an obstruction. This step is held on the beam and made adjustable to any sized beam by means of a single bolt, M', and a clamp, L', as seen in the section. The clamp L' having a slotted hole through it, the incline N' presses the clamp laterally against the beam, and the lip O' of the clamp L' is drawn up vertically beneath the beam by means of the bolt, thus making the step adjustable to different-sized beams, and holding all in place by means of the incline N' and a single bolt.

The quadrant, Fig. 22, is cast in a single piece, ready for use, and provided, in addition to the usual notches in the periphery, with a series of holes, P', in conjunction with the notches R'. A pin, S', is provided and held in place by means of a nut, T', as seen in Figs. 1, 2, 3, and 25. When the plow is to be locked in the ground a pawl attached to the lever falls into the notches in the periphery of the quadrant, and it requires attention to see that the pawl is placed in the same notch each time after raising the plow. The object of the holes P' and pin S' is: After having determined the depth which it is intended to plow, the pin S' is placed in a hole accordingly, and the operator throws the lever down until it strikes the pin, and lets go the latch without any care as to which notch it will fall into.

The quadrant is provided with a lug or bearing, U', and cleats V' V', as seen in Fig. 22. The cleats V' V' embrace the tongue timber or bar A'', and the lug U' forms the pivot for the lifting-lever M, the whole being held firmly in place by means of a single bolt, W'.

The clamp X', Figs. 9 and 23, connects the levers M N by means of the bolt B² passing through the whole. This clamp X' carries the pawl Y', which falls into notches in the quadrant, as seen in Fig. 25. The pawl is connected to the latch D² by means of the rod C². The spring on the latch D² throws the pawl down into the notches in the periphery of the quadrant.

When it is desired to allow the lifting-lever to play loose, as in plowing across corn-rows becomes necessary, a screw, Z', holds the pawl Y' out of the notches in the quadrant, as plainly shown in the sectional view, Fig. 9.

I am aware that a link or loop for holding a pawl out of engagement with a notched quadrant is common in wheel-plows, and such I distinctly disclaim, as it is a feature which I desire to avoid on account of its defects, and have introduced the set-screw instead on account of its greater efficiency.

By reference to Fig. 9 it will be seen that the bolt B² passes through levers M N and through clamp X', and the lip A² of clamp X' falls down on the inside of the quadrant and prevents the lever M from slipping off of the pivot U' of the quadrant. The pawl Y' slides in a recess in clamp X'. Thus it will be seen that a single bolt, B², holds levers M N, clamp X', and through said clamp the pawl Y', and also holds lever M onto the pivot U' by means of the lip A² falling down on the inside of the quadrant. A single bolt, W', holds the quadrant firmly in place, as seen in Figs. 3 and 9, by means of the cleats V' V' clasping the timber A''. Thus the two bolts B² and W' hold in place the entire lifting mechanism, and by means of a single screw, Z', the plow is locked in the ground or allowed to play loose, as may be required. E² is a clamp attached to the bail on either side of the hanger I, for the purpose of parallel lateral adjustment of the plow, to adapt it to two or three draft-animals or other circumstances.

The wooden bars A' A'' are placed in the socketed bearings Z Z of the seat-arch, and braced by means of the bar K², as seen in Fig. 3. The tongue B' is bolted beneath either of the bars A' A'', as the case may require, for two or three animals. The foot-rest L² extends back beneath the center tongue-bearing. The bolts M² pass upward through the rear end of the foot-rest to hold it in place, and through the slots P² of the bearings Z, through the tongue-timber A', and up through the seat-spring N², which supports the seat O². Thus the bolts M² perform the triple office of holding the foot-rest, the timber A', and the seat-spring.

The weed-hook D' is attached to the plow-beam by means of the clip C', and is made adjustable longitudinally and held in place by means of the set-screw E'.

The seat-arch is cast in a single piece, with the various bearings cast as integral parts thereof, as shown in Figs. 20 and 21, with the vertical bar R², upon which the land-wheel mechanism slides up and down to adjust the sulky to the depth of furrow required, and with the slots P² for the bolts which hold the tongue-timbers. As the pattern parts in the middle, these slots P² may be cast and avoid the necessity of drilling holes for the bolts. Thus the seat-arch is cast ready for use without any drilling or fitting whatever. The corrugations to support the land-wheel in position when adjusted are shown in Fig. 7. The hollow bearings P and S² for the bail and the lifting-lever for the land-wheel are shown in section at Fig. 8. The bearing O, Fig. 20, is provided with a cap, T², as seen in the rear view, Fig. 2.

The land-wheel A³ is placed upon the spindle U², as best seen in the section, Fig. 8, the spindle being attached to the slide V², which slide moves up and down on the part R² of the seat-arch. The set-screw W² performs the double office of holding the spindle U² in place and also the lifting-bar X², which lifting-bar is connected to the crooked lever Y² by means of a socket-joint, as best seen in the section, Fig. 8, where it will be seen that there is no strain on the bolt except to hold the parts together. The crooked lever Y² is pivoted upon the hollow bearing S² of the seat-arch and held upon the bearing by means of the bolt B³.

By means of the lever Y² and the lifting-lever X² the slide V², carrying the spindle U², is raised and lowered and held in position by means of corrugations, as shown in Fig. 7, where the corrugations are held intact by means of the cam-lever C³, which cam operates upon the corrugated block D³ to press it in contact with the part R² of the seat-arch, as seen at Figs. 6 and 7.

The part R² of the seat-arch containing the corrugations is sloped or beveled, as seen in Fig. 6, and the corrugated block D³ is sloped to match, the sloping of these parts being for the purpose of clamping the slide V² more rigidly to the seat-arch and preventing the land-wheel from wriggling. By this construction the land-wheel is held as firmly to the seat-arch as the furrow-wheel. When it is necessary to raise or lower the slide V² and axle the cam-lever C³ is thrown up, and a lug, F³, attached to the cam strikes a lug, E³, attached to the block D³, and withdraws the teeth of the block D³ from the teeth of the part R² of the seat-arch and allows the slide V² to play freely up and down on the part R² of the seat-arch, and when the slide V² is adjusted the cam-lever C³ is pressed downward and the whole firmly clamped together, the whole mechanism being cast ready to go together without fitting.

In Figs. 1 and 2 the plow is shown partially raised from the ground. In Fig. 19 the plow is shown down, as when at work, and showing the horizontal position of the bail when pivoted above the beam instead of below. Figs. 17 and 18 represent furrow-gages to gage the furrow and cut it of uniform width under all circumstances.

The roller H³, Fig. 17, works in direct conjunction with the plow by pressing against the edge of the preceding furrow, to hold the plow and prevent it from cutting an uneven furrow from the irregularity of the draft of the team or otherwise taking too much land. The roller H³ is made flaring outward at the bottom, and the side next the plow placed perpendicular throws the outward corner up from the ground and prevents friction, while the lower inside corner next the plow rests nearly in the bottom of the furrow to bear firmly against the side of the preceding furrow. This roller has a shield, I³, to protect the bearing upon which the roller revolves from grit or dirt, the whole being suspended from the furrow-wheel axle or frame of the sulky by means of the pendant G³.

Fig. 18 shows a modification of the same device for the same purpose, wherein a runner, J³, is attached to the pendant K³, instead of a roller. By means of the furrow-gage to rest against the perpendicular side or edge of the preceding furrow, a portion of the friction is taken from the landside of the plow and transferred to the roller. Hence the landside of the plow may be left off and the lateral or side pressure carried on the roller, the effect of which is to lighten the draft of the plow, while at the same time gaging the furrow and cutting it of a uniform width, which is very desirable.

Having thus fully described my invention, what I claim, and desire to secure by Letters Patent, is—

1. The quadrant A⁴, cast in a single piece and provided with notches in its periphery, holes P', and integral bearing U' for the lever, in combination with said lever and the adjustable pin S', for the purpose specified.

2. The quadrant A⁴, cast in a single piece and provided with notches in its periphery, holes P', and integral stud or bearing U' for the lever M.

3. The quadrant A⁴, cast in a single piece and provided with notches in its periphery, holes P' for the pin S', stud U', cleats V' V', and held onto the timber A'' by means of bolt W', in combination with levers M N, clamp X', and pawl Y', substantially as set forth.

4. The quadrant A⁴, cast in one piece and provided with notches in its periphery, holes P', and integral stud U', in combination with levers M N, clamp X', pawl Y', and pin S', substantially as set forth.

5. The step K', attached to the plow-beam D, and made adjustable by means of clamp L', incline N', lip O', and bolt M', substantially as set forth.

6. In a wheel-plow, the combination, with the plow-beam, of the oscillating or vibrating leveling device J, through which the plow-beam passes, said device being provided with a wedge-shaped hole and set-screws for the oblique adjustment of the beam, substantially as set forth.

7. In a wheel-plow, the combination of the seat-arch, the stationary furrow-wheel axle, and the land-wheel axle, attached to the slide V², and both connected to and by said seat-arch, and each operating independent of the other, the slide carrying the land-wheel being locked to the seat arch by means of cam-lever C³ and block D³.

8. In combination with the axle of a wheel-plow, the pendant G³, suspended from said axle and carrying a conical roller the axis of which is turned outward, substantially as set forth.

9. The pendant G³, attached to the axle and provided with the shield I³, in combination with a conical roller arranged with the side next the land perpendicular, substantially as set forth.

10. In combination with lever M, clamp X', and pawl Y', the set-screw Z', for the purpose specified.

11. The seat-arch B, provided with integral double socketed bearings Z Z, in combination with the tongue-timbers A' A'', permanently fixed therein, for the purpose specified.

12. In combination with the seat-arch, provided with bearing Z, and tongue-timber A', the foot-rest L² and seat-spring, the whole being held together by means of the bolts M².

13. In a wheel-plow, the combination, with the plow-beam D and bail C, of the pivoted hanger I and oscillator J, forming a direct connection between said plow-beam and bail, the beam passing through the hanger and oscillator, the said hanger and oscillator being provided with corrugations X, and being held together by means of the bolts W and U, substantially as set forth.

FRANKLIN B. HUNT.

Witnesses:
 DE WITT C. ALLEN,
 H. A. DANIELS.